United States Patent [19]
Nagano

[11] 3,798,988
[45] Mar. 26, 1974

[54] ANTI-BOLT ROTATION MECHANISM
[76] Inventor: Masashi Nagano, Sakai, Japan
[22] Filed: June 11, 1973
[21] Appl. No.: 369,072

Related U.S. Application Data
[62] Division of Ser. No. 252,424, May 11, 1972.

[30] Foreign Application Priority Data
May 12, 1971  Japan.................................. 46-31845

[52] U.S. Cl. .................................. 74/240, 74/217 B
[51] Int. Cl. ......................... F16h 7/18, F16h 11/04
[58] Field of Search .......... 74/240, 217 B, 242.15 B

[56] References Cited
UNITED STATES PATENTS
3,111,039  11/1963  Peras ................................ 74/240 X
3,730,012  5/1973  Juy ................................. 74/217 B X Primary Examiner—Leonard H. Gerin
Attorney, Agent, or Firm—Toren and McGeady

[57] ABSTRACT

The present invention provides a mechanism for preventing the forced rotation of adjusting bolt means adapted to adjust the distance between two members, the moving range within which one of said members is permitted to move toward the other, and also the position where said one of the members is to stop such movement.

Said mechanism comprises a plate member made of synthetic resin material and provided with perforated holes each having a diameter which is substantially smaller than the major diameter of the adjusting bolt means but larger than the minor diameter thereof, said plate member being fixed unmovable to the adjusting bolt means by inserting the bolt means in said perforated holes.

3 Claims, 8 Drawing Figures

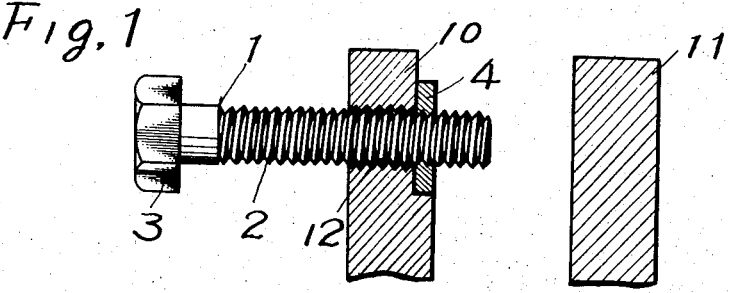
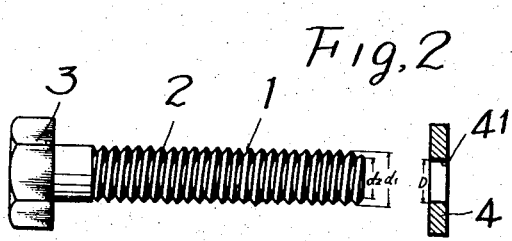
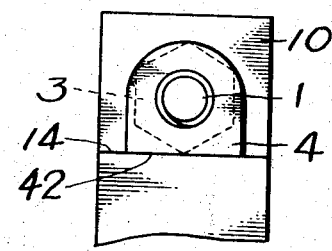
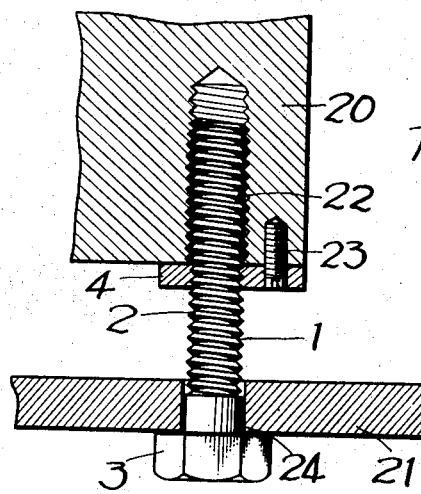

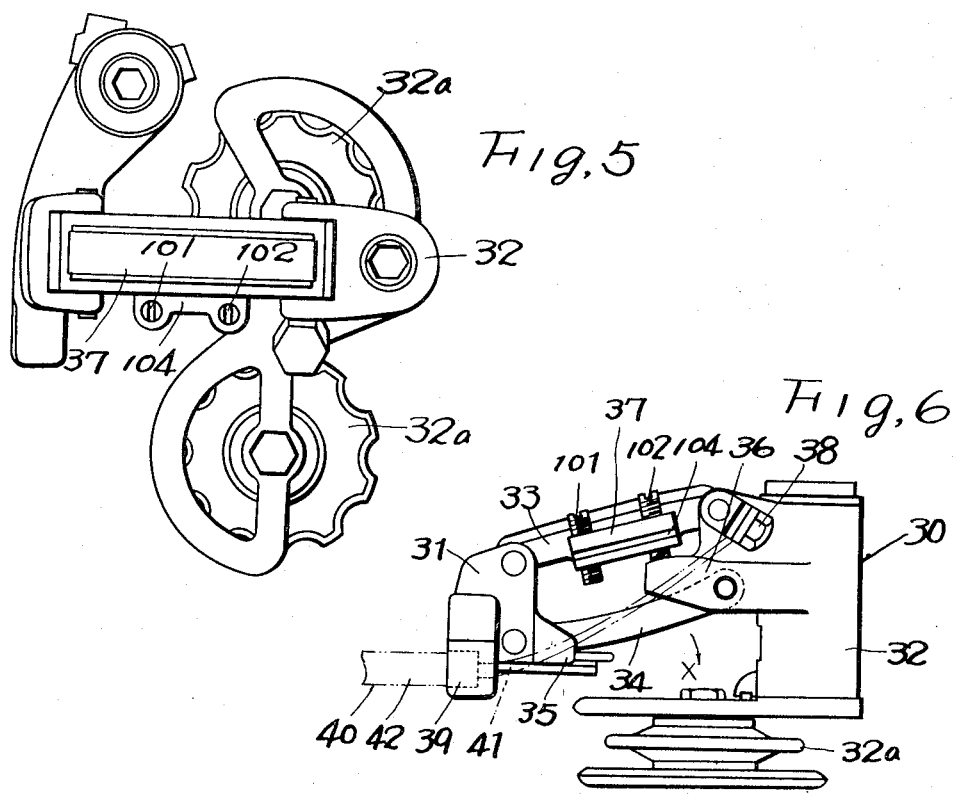
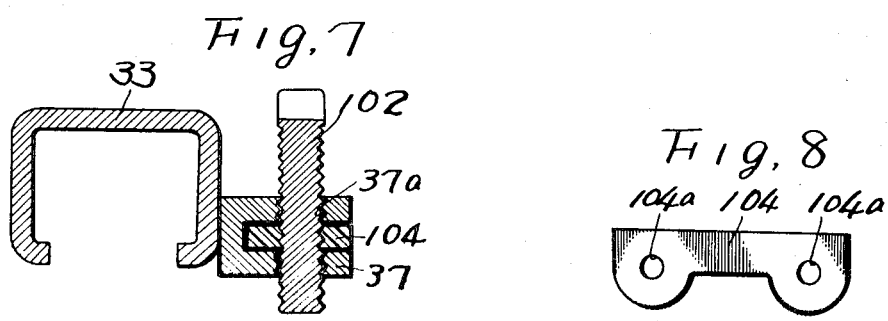

ANTI-BOLT ROTATION MECHANISM

This is a division of application Ser. No. 252,424 filed May 11, 1972.

The present invention relates generally to an adjusting bolt holding means, and more particularly to a mechanism suitable for use to hold adjusting bolt means in position which are adapted to control the swinging angle of a chair guide means of an externally mounted chain shifting device for bicycles so as to prevent the involuntarily forced movement of the bolt means that might otherwise easily occur subject to frequest vibrations.

In a general way, an adjusting bolt means is peripherally threaded and has its head portion diametrally formed with a groove which permits the bolt means to be adjustably screwed by means of a screw driver or the like in a manner that the threaded portion of the bolt means can move to and from one of the two members mounted in relatively movable relation on a chain shifting device so as to position the foremost end of the bolt means in adjustable relation to the members thereby selectively modifying the moving extent of the two members.

However, different from usual bolt means employed to be tightly fixed to both of the two members, the above-mentioned adjusting bolt means are adapted to be applied to only one of said two members so that they are involuntarily forced to move and loosened subject to outwardly imparted frequent vibrations, the result being that the adjusted position of the bolt means is moved out of order.

Incidentally, in addition to being employable to adjust the moving or swinging extent of the aforesaid two relatively movable members, the adjusting bolt means are also usable to adjust the moving extent of the two members of such a type that one of the members is held in fixed position and the other member is supported in movable relation thereto; to take an example, the former case is applied to the aforesaid adjusting bolt means to be used for a chain shifting device for bicycles, and the latter case is applied to such bolt means that they can adjust the pedalling operation of an axle pedal device for cars. Furthermore, said bolt means are usable for adjusting the distance or space between the two members of said type wherein one of the members is held in fixed position and the other member is supported in movable relation thereto; for example, this case is applicable to an adjusting bolt means of a saddle for bicycles.

In order to eliminate or mitigate the above-mentioned drawbacks of the conventional adjusting bolt means, there is widely used such a type of bolt means that a coil spring is mounted between the head portion of an adjusting bolt means and a member to which said bolt means is screwed up to keep the head portion resiliently pressed against the member thereby to prevent the loosening of the bolt means, for instance, just as seen in the adjusting bolt means of an externally mounted chain shifting device for bicycles.

However, in order to provide this type of bolt means it is necessary not only to arrange a spring separately but also to take the trouble of making a bolt body much longer than the conventional one for that express purpose, with a spring receiving portion especially formed on the head portion of the bolt body. Nevertheless, the bolt means thus produced cannot still be prevented from its involuntary or forced movement subject to the frequest vibrations.

Accordingly, the present invention has been designed to eradicate all the above-mentioned defects and disadvantages and has for one of its main objects the provision of a structurally much simplified mechanism that can completely prevent the movement of an adjusting bolt means.

Another object of the invention is to provide a mechanism suitable for use with adjusting bolt means mounted to such vibratile devices as a bicycle thereby to completely prevent the movement of the bolt which otherwise might easily occur subject to the vibrations.

A further object of the invention is to provide a mechanism that can be advantageously mass-produced at a very low cost by constructing the same without resorting to any extra process and constituents.

According to the present invention, all the above-mentioned objects can be accomplished by providing such constructions that a synthetic resin plate is bored with perforated holes each having substantially a smaller diameter than the major diameter of an adjusting bolt means to be used in the invention thereby forcibly inserting said bolt means into each of the holes to result in the plate being held unmovably in position.

These and other objects and advantages of the present invention will become apparent from the following description made with reference to some preferred embodiments of the invention shown by way of example in the accompanying drawings and from the appended claims.

In the drawings:

FIGS. 1 to 4 are respectively explanatory of the fundamental principle of the present invention wherein especially;

FIG. 1 is a sectional view illustrating a mechanism for preventing the movement of an adjusting bolt means adapted to selectively control the moving extent or maximum moving limit of two relatively movable plate members;

FIG. 2 is a sectional view illustrating the relation between said bolt means and a synthetic resin plate;

FIG. 3 is an open-up view shwoing the interior of FIG. 1;

FIG. 4 is a sectional view illustrating the mechanism for preventing the movement of the bolt means for adjusting the distance or space between said pair of plate members;

FIGS. 5 to 7 are respectively showing the cases wherein said mechanism is applied to adjusting bolt means of a chain shifting device for bicycles, in which;

FIG. 5 is a front view thereof;
FIG. 6 is a bottom plan view, and
FIG. 7 is an enlarged sectional view taken on the line V11 — V11 of FIG. 6; and
FIG. 8 is a plan view of a synthetic resin plate to be used in the invention.

In the following, reference will be made to the drawings.

While the adjusting bolt means to which the mechanism of the present invention can be applied are widely used for bicycles, cars and many other industrial mechinery, the range of their use is: (1) adjustment of the moving extent between a pair of plate members 10 and 11 shown in FIG. 1, (2) adjustment of the position to which one movable plate member 11 in FIG. 1 is limited in moving to the other unmovable or fixed plate member 10, and (3) adjustment of the distance where a movable plate member 21 composing the two opposed plate members 20 and 21 shown in FIG. 4 can move to the other unmovable or fixed plate member 20.

Namely, the above-mentioned first use of the adjusting bolt means is to control the swinging extent of a chain guide connected to a link means pivotally supported on a bracket means of an externally mounted chain shifting device for bicycles, the second use is to control the maximum pedalling position of an axle pedal for cars, and the third use is to control the interval between the two members respectively supporting a bicycle saddle top and a spring receiving portion.

The mechanism of the present invention is employable to prevent the movement of the adjusting bolt means having the above-mentioned range of use.

In FIGS. 1 to 4, reference numeral 1 generally designates a bolt body to be screwed to said plate member 10 or 20. Said plate member 10 or 20 is bored with a threaded hole 12 or 22 while said bolt body 1 is tapped with a screw thread portion 2 screwable to said threaded hole 12 or 22.

Incidentally, the head 3 of the bolt body 1 is polygonal so that it permits the bolt body 1 to be screwably tightened or loosened. However, the configuration of the head 3 is not necessarily limited to a polygonal shape as is shown in FIG. 3 but it may be formed into any other suitable shape having a diametral groove which permits the bolt body 1 to be screwably moved by means of a screw drive or the like.

Reference numeral 24 in FIG. 4 denotes a hole perforated through a plate member 21. By inserting into this hole 24 the bolt body 1 can be tightly fixed to the plate member 21 and by moving the bolt body 1 the distance between the members 20 and 21 can be selectively changed.

Numeral 4 designates a synthetic resin plate member which is part and parcel of the present invention to form a mechanism for preventing the involuntary or forced movement of the adjusting bolt means. As is clearly evident in FIG. 2, said plate member 4 has in its center a perforated hole 41 of which the inner diameter D is smaller than the major diameter d1 of said adjusting bolt means and substantially greater than the minor diameter d2 thereof.

Said plate member 4 is made of such a synthetic resin for example as a polyamide resin which is essentially hard per se but less hard than the material of which the adjusting bolt means is made. The plate member 4 has such a width that at least one external screw thread of the bolt means can be fully turned in said perforated hole 41, namely, more than one pitch (normally two or three pitches) of said external screw thread can be engaged to the inner periphery of the hole 41.

The mounting of the plate member 4 is made possible by screwably inserting the bolt means 1 into said hole 41 formed without internal screw thread. In other words, when the bolt means 1 is forcibly turned in the hole 41, the inner wall of the hole 41 which is materially less hard than the bolt means 1 is forced to change in shape to receive the bolt means 1. When the bolt means 1 is stopped turning in the hole 41, the inner wall of the hole 41 restores its proper nature and screwably holds the inserted screw thread portion of the bolt means 1 as is shown in FIG. 1. Consequently, the bolt means 1 is firmly held in a selectively adjusted position and completely prevented from being involuntarily moved by the vibrations of the plate member 4.

As is clearly evident in FIG. 3, one side of the plate member 4 is so shaped as to form a straight edge 42 with which a step 14 cut in said plate member 10 is engaged thereby preventing the movement of the adjusting bolt means 1.

In addition, the anti-bolt rotation mechanism of the present embodiment can be obtained by rigidly fixing the plate member 4 to the plate member 20 by means of a screw 23 as shown in FIG. 4. Furthermore, it can also be obtained by using a pair of adjusting bolt means to which a single plate member is mounted as is clearly evident from the subsequent description of an externally mounted chain shifting device to which said pair of adjusting bolt means are applied. Furthermore, it can also be obtained by providing such a construction that a pair of adjusting bolt means are held in the subsequent description of an externally mounted chain shifting device in which said pair are employed whereby the adjusting bolt means 1 can be firmly held in fixed position. The adjusting bolt means 1 can be easily adjusted by forcibly turning the same with a screw driver or a wrench and thereafter permanently fixed in an adjusted position.

Now setting forth in detail the embodiment of the anti-bolt rotation mechanism carrying out the present invention with reference to FIGS. 5 to 8 in the drawings wherein the mechanism is applied to an externally mounted chain shifting device 30 for bicycles, said device 30 generally comprises a fixing bracket 31 for fixing said device 30 to a rear wheel of a bicycle, a chain guide 32 having a pair of guide wheels 32a for guiding a driving chain, and a pair of parallel links 33, 34 mounted between said fixing bracket 31 and said chain guide 32 so as to sway the chain guide 32 to the fixing bracket 31; a pair of adjusting bolt means 101, 102 to be employed in the invention are juxtaposed with one another on the link 33.

Said adjusting bolt means 101, 102 are adapted to control the swinging extent of the chain guide 32 to the fixing bracket 31. Said fixing bracket 31 and said chain guide 32 are respectively provided with controlling elements 35, 36. To be more precise, said chain guide 32 is deviated in one direction under the resiliency of a spring means (not shown in the drawings) so as to keep the controlling element 36 in contact with the adjusting bolt means 102, as is shown in FIG. 6, whereby said chain guide 32 is deviated.

To said chain guide 32 is connected the terminal of an inner wire 41 of an operating sheath 40. Thus by manipulating an operating lever (not shown in the drawings) to pull said operating sheath 40, the chain guide 32 is made to swing in the direction shown by the arrow X from the position where it is deviated oppressively against said spring means so that a driving chain engaged with the guide wheel 32a is moved to the same direction as the axis of the rear wheel thereby to change the running speed of a bicycle to a desired rate.

The swinging operation of the chain guide 32 continues until the adjusting bolt means 101 is brought into contact with the controlling element 35. The swinging extent of the chain guide 32 ranges from the contacting point of the bolt means 102 with the controlling element 36 to the contacting point of the bolt means 101 with the controlling element 35. Accordingly, by selectively adjusting the positional relation between these bolt means 101 and 102, said swinging extent of the chain guide 32 can be easily modified.

As shown in FIGS. 5 and 6, the adjusting bolt means 101, 102 are generally mounted to a sectionally U-shape fixing base 37 rigidly fixed to the parallel link 33. The both sides of said fixing base 37 are perforated with threaded holes 37a into which each adjusting bolt means 101, 102 is screwably inserted.

Incidentally, numeral 38 in FIG. 6 designates a fixing means for fixing said terminal of the inner wire 41 covered with the operating sheath 40 and numeral 39 denotes a holding means for holding the terminal of an outer wire 42 covered with the sheath 40, respectively.

The operation of the anti-bolt rotation mechanism in accordance with the present invention can be effected by means of the above-mentioned plate member 104 made of the same synthetic resin material as the plate member 4 employed in the preceding embodiment. Said plate member 104 is substantially of the same shape as the fixing base 37 as is shown in FIG. 8; the both sides of the plate member 104 are perforated with holes 104a, respectively, of which the diameter is smaller than the major diameter of the bolt means 101, 102 but is substantially larger than the minor diameter thereof, similarly to the holes 41 in the preceding embodiment.

Inasmuch as each of the adjusting bolt means 101, 102 is mounted to the plate member 104 by screwably inserting the same in each hole 104a of the plate member 104, said plate member is not caused to turn along with the bolt means 101, 102 when the screwable inserting operation of the bolt means is effected.

As has been mentioned above, the swinging range of the chain guide 32 can be selectively adjusted by forcibly turning either of the bolt means 101, 192, and once adjusted, the bolt means stays firmly fixed to the plate member 104 thereby permanently keeping its adjusted position.

In the present embodiment, a single plate member 104 is employed to fix thereto said pair of adjusting bolt means 101, 102, but instead a pair of plate members 104 may also be employed to fix thereto said bolt means 101, 102. In addition to the above-mentioned bolt fixing methods, said plate member 104 may also be fixed to one side of the fixing base 37 in order to keep the adjusting bolt means in fixed position.

As has been clearly understood from the preceding description, the anti-bolt rotation mechanism in accordance with the present invention can be obtained in the form of much simplified structure by fixedly connecting a synthetic resin plate member to adjusting bolt means.

It is thought that the invention and many of its attendant advantages will be understood from the foregoing description, and it will be apparent that various changes may be made in the form, cast construction and arrangement of the parts without departing from the spirit and scope of the invention or sacrificing all of its material advantages, the form hereinbefore described being merely a preferred embodiment thereof.

The Embodiments of the Invention in which an Exclusive Property or Privilege is claimed are defined as in the following:

1. An anti-bolt rotation mechanism to be used for preventing the rotation of a pair of adjusting bolt means in an externally mounted chain shifting device for bicycles, comprising a fixing bracket means rigidly fixed to a rear wheel shaft of a bicycle, a pair of link means, and a chain guide including a pair of chain guide wheels swingable together with the swinging movement of said link means, said mechanism further comprising
    a. a fixing base that has a pair of threaded holes for permitting said adjusting bolt means to be screwably inserted therein and is rigidly fixed to one of said link means,
    b. a plate member made of synthetic resin material, which is provided with perforated holes each having a diameter smaller than the major diameter of said screw thread portion of the bolt means and fixed thereto along said fixing base, and
    c. a fixing means for fixing said plate member to said adjusting bolt means in unmovable relation.

2. The anti-bolt rotation mechanism, as set forth in claim 1, in which said fixing base is formed with a pair of opposed plate elements between which said synthetic resin plate member is sandwiched.

3. The anti-bolt rotation mechanism, as set forth in claim 1, in which said plate member is formed in conformity with the configuration of said fixing base, and provided adjacent to the both sides thereof with said perforated holes, respectively.

* * * * *